(12) United States Patent
Wade et al.

(10) Patent No.: US 11,495,930 B2
(45) Date of Patent: Nov. 8, 2022

(54) AUTO-LOCK ASSEMBLY

(71) Applicant: AMERICAN FURUKAWA, INC., Plymouth, MI (US)

(72) Inventors: Jere Wade, Swartz Creek, MI (US); Richard Michael Bowes, Farmington Hills, MI (US); Edwin John Carey, II, Grand Blanc, MI (US)

(73) Assignee: American Furukawa, Inc., Plymouth, MI (US)

( * ) Notice: Subject to any disclaimer, the term of this patent is extended or adjusted under 35 U.S.C. 154(b) by 95 days.

(21) Appl. No.: 17/168,996

(22) Filed: Feb. 5, 2021

(65) Prior Publication Data

US 2022/0255276 A1 Aug. 11, 2022

(51) Int. Cl.
- *H01R 39/00* (2006.01)
- *H01R 35/04* (2006.01)
- *B60R 16/02* (2006.01)

(52) U.S. Cl.
CPC ......... *H01R 35/04* (2013.01); *B60R 16/0215* (2013.01); *H01R 2201/26* (2013.01)

(58) Field of Classification Search
CPC ............................. H01R 35/025; B60R 16/027
See application file for complete search history.

(56) References Cited

U.S. PATENT DOCUMENTS

| | | | | |
|---|---|---|---|---|
| 5,882,216 A * | 3/1999 | Matsumoto | ........... | B60R 16/027 439/15 |
| 5,944,541 A * | 8/1999 | Payne | ................ | H01R 13/6474 439/108 |
| 6,007,355 A * | 12/1999 | Shibata | ................. | B60R 16/027 439/15 |
| 6,222,142 B1 * | 4/2001 | Sano | .................... | B60Q 1/1461 200/61.54 |
| 6,305,958 B1 * | 10/2001 | Maegawa | ............. | B60R 16/027 439/15 |
| 6,471,529 B2 * | 10/2002 | Oishi | .................... | B60R 16/027 439/164 |

(Continued)

FOREIGN PATENT DOCUMENTS

| | | |
|---|---|---|
| CN | 213243074 U | 5/2021 |
| FR | 2756108 A1 | 5/1998 |

(Continued)

OTHER PUBLICATIONS

Search Report regarding corresponding EP App. No. 22154330.9; dated Jul. 1, 2022.

*Primary Examiner* — Phuong Chi Thi Nguyen
(74) *Attorney, Agent, or Firm* — Dickinson Wright PLLC (57) ABSTRACT

A steering roll connector configured to operatively engage a steering column. The steering roll connector may comprise a roll stator and a roll rotor telescoped in and rotatable with the roll stator. The roll rotor may have a wall and a surface, and the wall may define an opening for receiving the steering column. A slide may be supported by and movable on the surface from an unengaged position to an engaged position where the slide is positioned to engage and prevent the relative rotation between the roll rotor and roll stator. A spring may operatively engage the slide to causes it to be in the engaged position. When the steering column is received in the opening, a lever arm may operatively engage and pull the slide to the unengaged position.

20 Claims, 7 Drawing Sheets

(56) References Cited

U.S. PATENT DOCUMENTS

| | | | |
|---|---|---|---|
| 7,232,312 B2 * | 6/2007 | Wade | B60R 16/027 |
| | | | 439/4 |
| 2004/0209505 A1 * | 10/2004 | Wade | B60R 16/027 |
| | | | 439/164 |

FOREIGN PATENT DOCUMENTS

| | | | |
|---|---|---|---|
| FR | 2830989 A1 | 4/2003 |
| JP | 2009238419 A | 10/2009 |
| JP | 2016039108 A | 3/2016 |
| WO | 9843855 A1 | 10/1998 |

* cited by examiner

AUTO-LOCK ASSEMBLY

TECHNICAL FIELD

The present disclosure relates to a steering assembly, and more particularly, to a steering roll connector of the steering assembly.

BACKGROUND

Vehicles such as cars, trucks, sport utility vehicles, crossovers, mini-vans, or other suitable vehicles employ steering assemblies to facilitate steering of the vehicle. Steering assemblies typically include a steering column coupling between a hand-wheel and wheels of the vehicle. When the hand-wheel rotates, relative rotation of the hand-wheel transfers through the steering column to turn the wheels and steer the vehicle. Accordingly, a driver engaging, and rotating, the hand-wheel may steer the vehicle.

Hand-wheels typically include electronic components in communication with an electrical system of the vehicle. More specifically, wires connect between the electrical components of the hand-wheel and the electrical system of the vehicle. These wires, however, can become tangled and break due to over rotation of the hand-wheel. Accordingly, the steering column typically employs a steering roll connector configured to connect between wires of the electronic components and the electrical system to prevent the wires from becoming tangled and breaking.

The steering roll connector typically includes a roll stator and a roll rotor rotatably coupled to the roll stator. The roll rotor may also include an electrical connector that electrically connects between the wires of the electronic components and the electrical system. The relative rotation between the roll stator and the roll rotor prevents the wires from becoming tangled and breaking. However, the relative rotation may cause a miss-alignment between the hand-wheel and the steering column during assembly of the steering system.

SUMMARY

To prevent miss-alignment between a hand-wheel and a steering column during assembly of a steering system, the invention of the present disclosure provides a steering roll connector configured to restrict the relative rotation between a roll stator and a roll rotor of a steering roll connector.

The present invention concerns a steering roll connector configured to receive and operatively engage a steering column. In some embodiments, the steering roll connector may comprise a roll stator and a roll rotor telescoped in and rotatably coupled to the roll stator. In some embodiments, the roll rotor has a wall and a surface and the wall may define an opening sized to receive the steering column. A slide may be employed, supported by, and movable on the surface from an unengaged position to an engaged position. When employed the slide may be positioned to engage and prevent the relative rotation between the roll rotor and roll stator. In some embodiments, a spring may operatively engage the slide to causes the slide to be in or move to the engaged position. A lever arm may also be employed, where the lever arm operatively engages the wall and the slide and is configured to pull the slide to the unengaged position when the steering column is received in the opening.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

It is to be appreciated that the Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DETAILED DESCRIPTION

The following disclosure is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Generally, vehicles employ steering assemblies to facilitate steering of a vehicle by a driver. Steering assemblies typically include a steering column, which may include a steering column, coupling between a hand-wheel and wheels of the vehicle. When the hand-wheel rotates, relative rotation of the hand-wheel transfers through the steering column to the wheels of the vehicle. Accordingly, a driver engaging, and turning, the hand-wheel may steer the vehicle.

Hand-wheels typically include electronic components in communication with an electrical system of the vehicle. More specifically, wires connect between the electrical components of the hand-wheel and the electrical system of the vehicle. To prevent tangling and breakage of the wires due to over rotation of the hand-wheel, a steering roll connector may be employed in the steering assembly to connect between the electrical components of the hand-wheel and the electrical system of the vehicle.

Figure 1:
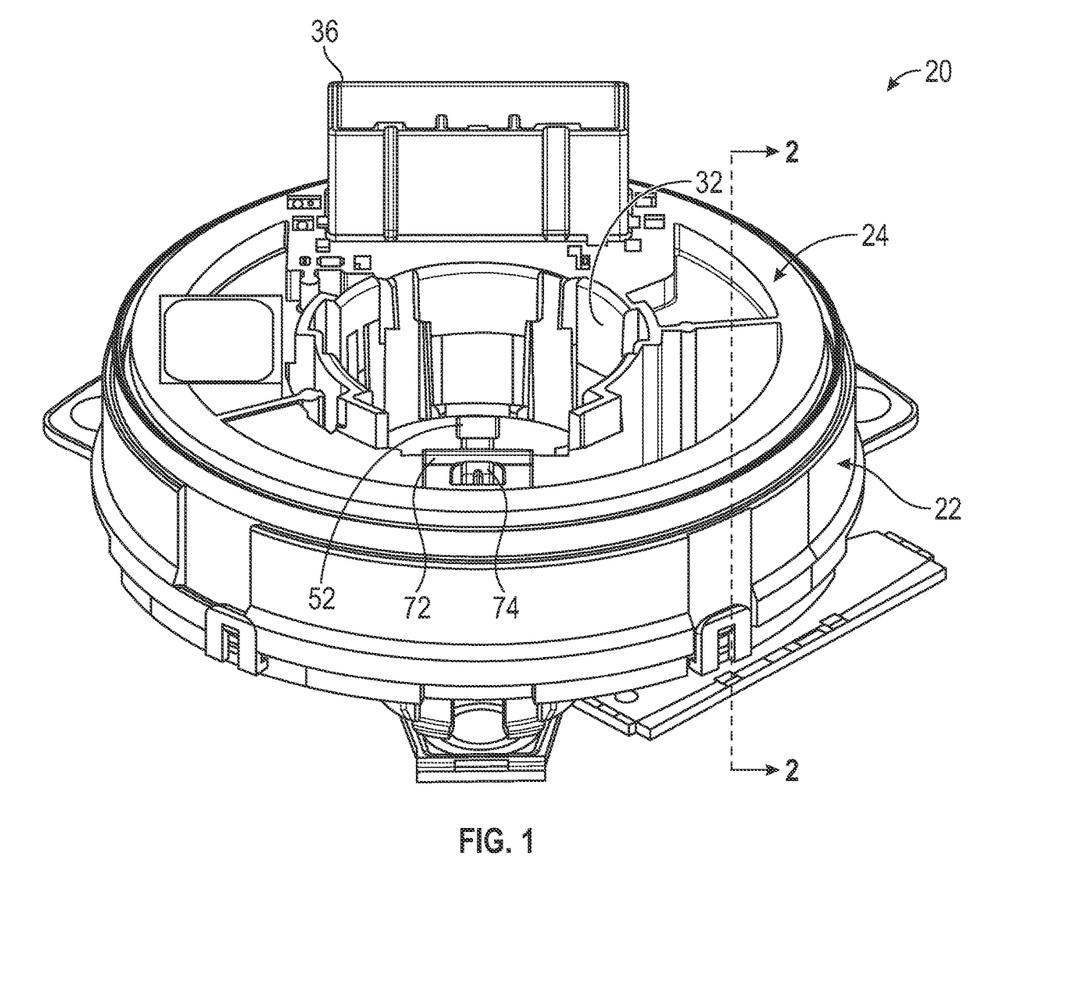
FIG. 1 is a perspective view illustrating an embodiment of a steering roll connector shown without a cover.
Figure 2:
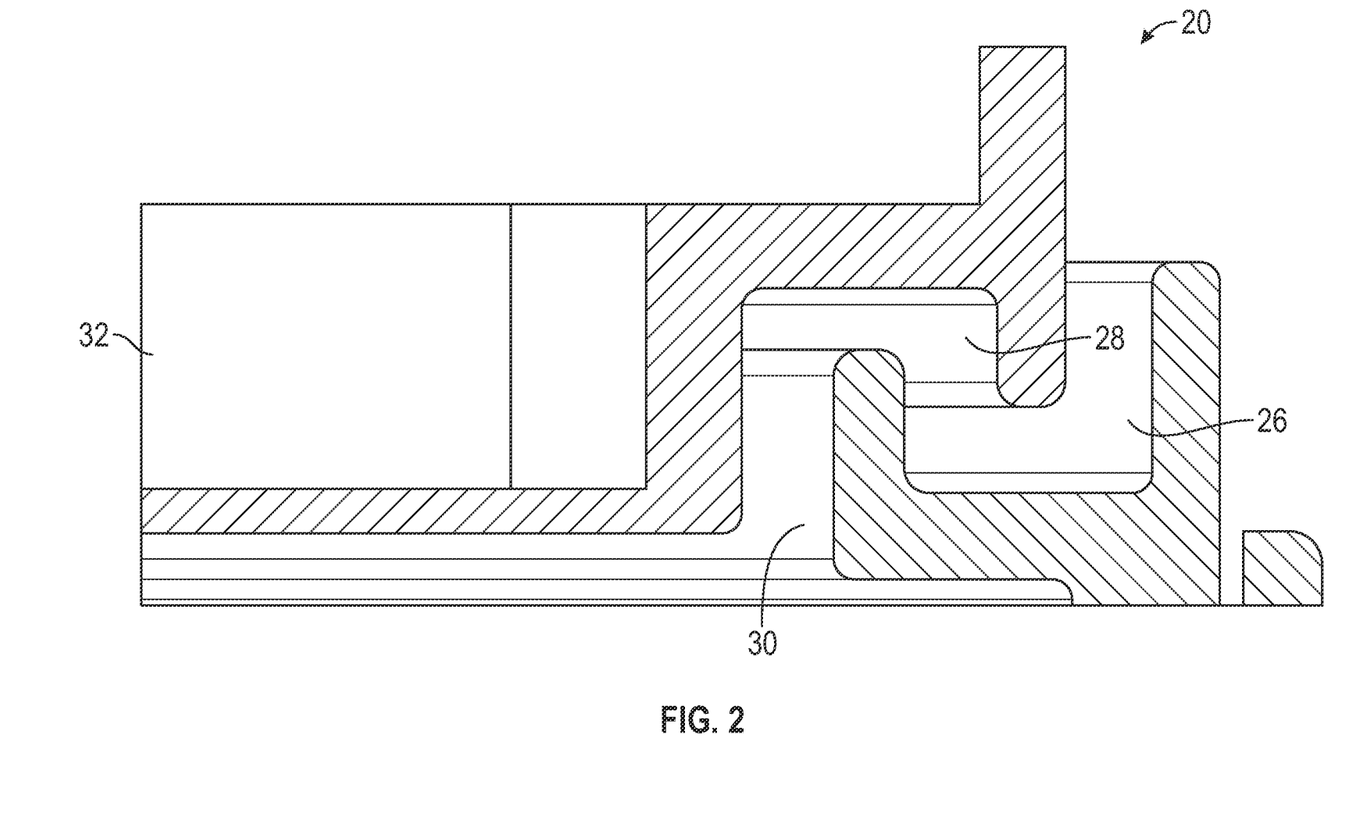
FIG. 2 is a sectional view of the steering roll connector, taken along line A of FIG. 1.

With reference to the FIGS. 1 and 2, a steering roll connector 20 of the present disclosure is illustrated. The steering roll connector 20 may include a roll stator 22 and a roll rotor 24 telescoped in and rotatably coupled to the roll stator 22. The telescoped relationship between the roll stator 22 and the roll rotor 24 is configured to facilitate relative rotation between the roll rotor 24 and the roll stator 22. In some embodiments, the roll stator 22 may define a female seat 26 (FIG. 2) and the roll rotor 24 may define a male seat 28 (FIG. 2). The female and male seats 26, 28 may engage one another and be configured to facilitate the relative rotation between the roll stator 22 and the roll rotor 24. In some embodiments, a bearing (not illustrated) may be positioned between the roll stator and rotor 22, 24 to facilitate the relative rotation between the roll stator and rotor 22, 24.

Figure 3:
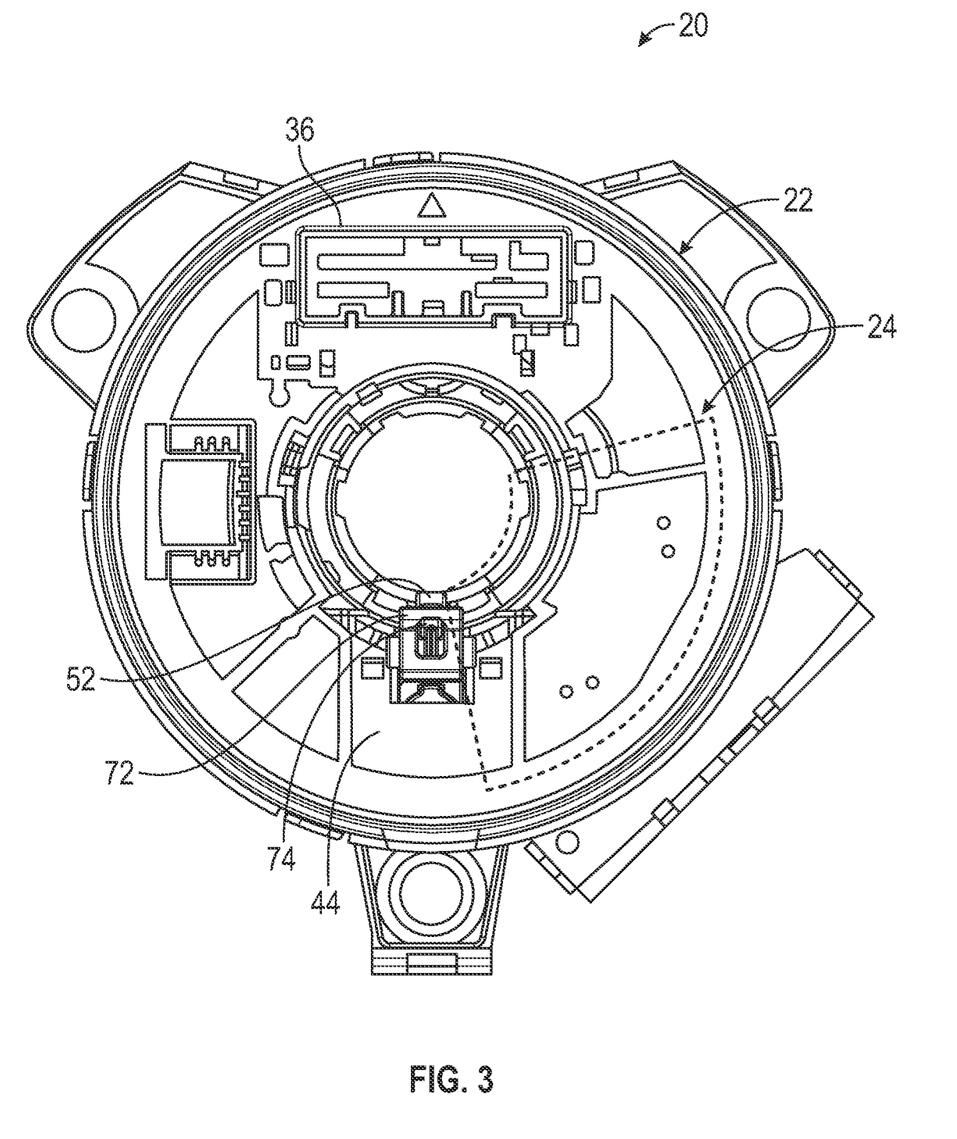
FIG. 3 is a perspective view illustrating an embodiment of a steering roll connector shown without a cover.

The roll stator 22 may define a first opening 30 (FIG. 2), and the roll rotor 24 may define a second opening 32 coaxially aligned with, and telescoped in, the first opening 30. The second opening 32 is configured to receive a steering column, or shaft (not illustrated), and the roll rotor 24 is configured to couple the steering roll connector 20 to the steering column. It is to be appreciated the roll rotor 24 may be configured in many different ways to receive and couple with the steering column and fall within the scope of the present invention. In some embodiments, the roll rotor 24 may have a wall, or inner wall, 38 that defines the opening 32. In some embodiments, the roll rotor 24 may have a surface 34 and a ledge 40 positioned at a periphery of the surface and extending from the surface 34. In some embodiments, the ledge 40 may define a slot 42. In some embodiments, a cover 44 (FIG. 3) may couple of the ledge 40. An electrical connector housing 36 may also be integrally formed with, or coupled to, the surface 34. The electrical connector housing 36 may be configured to facilitate the connection between the electrical components of the handwheel and the electrical system of the vehicle.

Figure 4:
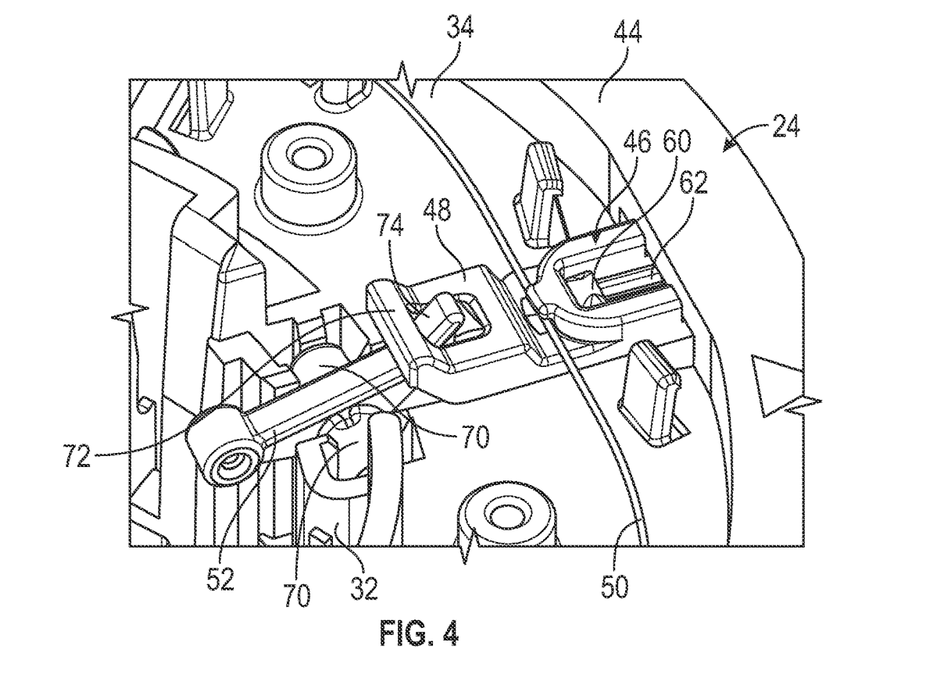
FIG. 4 is a partial perspective view an embodiment of the steering roll connector illustration the position of a locking lever, spring, and slide in an engaged position.
Figure 5:
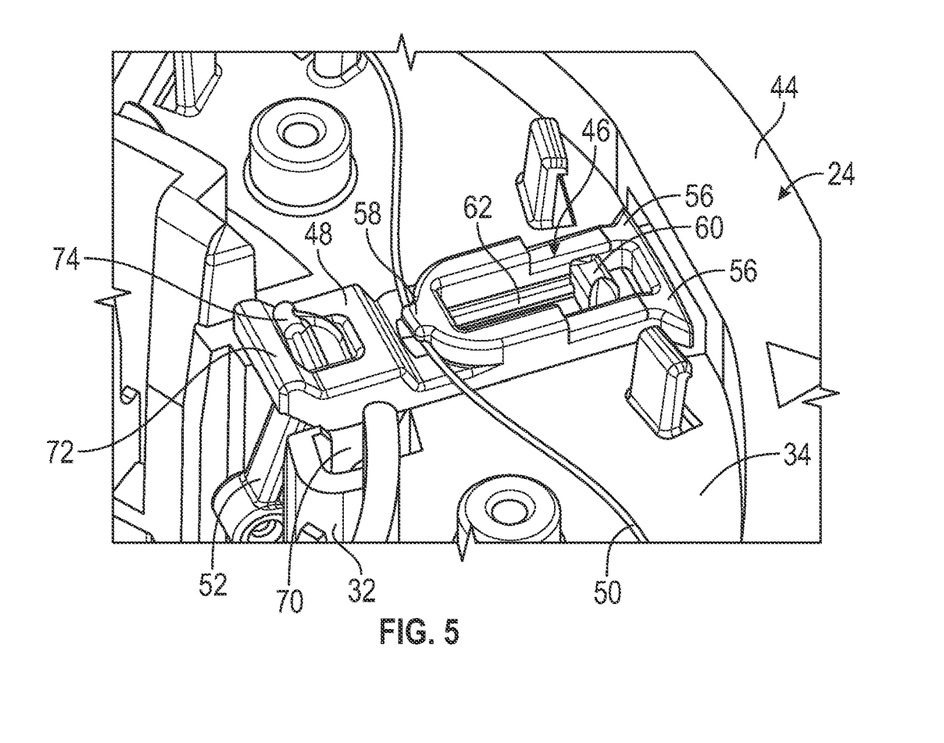
FIG. 5 is a partial perspective view an embodiment of the steering roll connector illustration the position of a locking lever, spring, and slide in an unengaged position.
Figure 6:
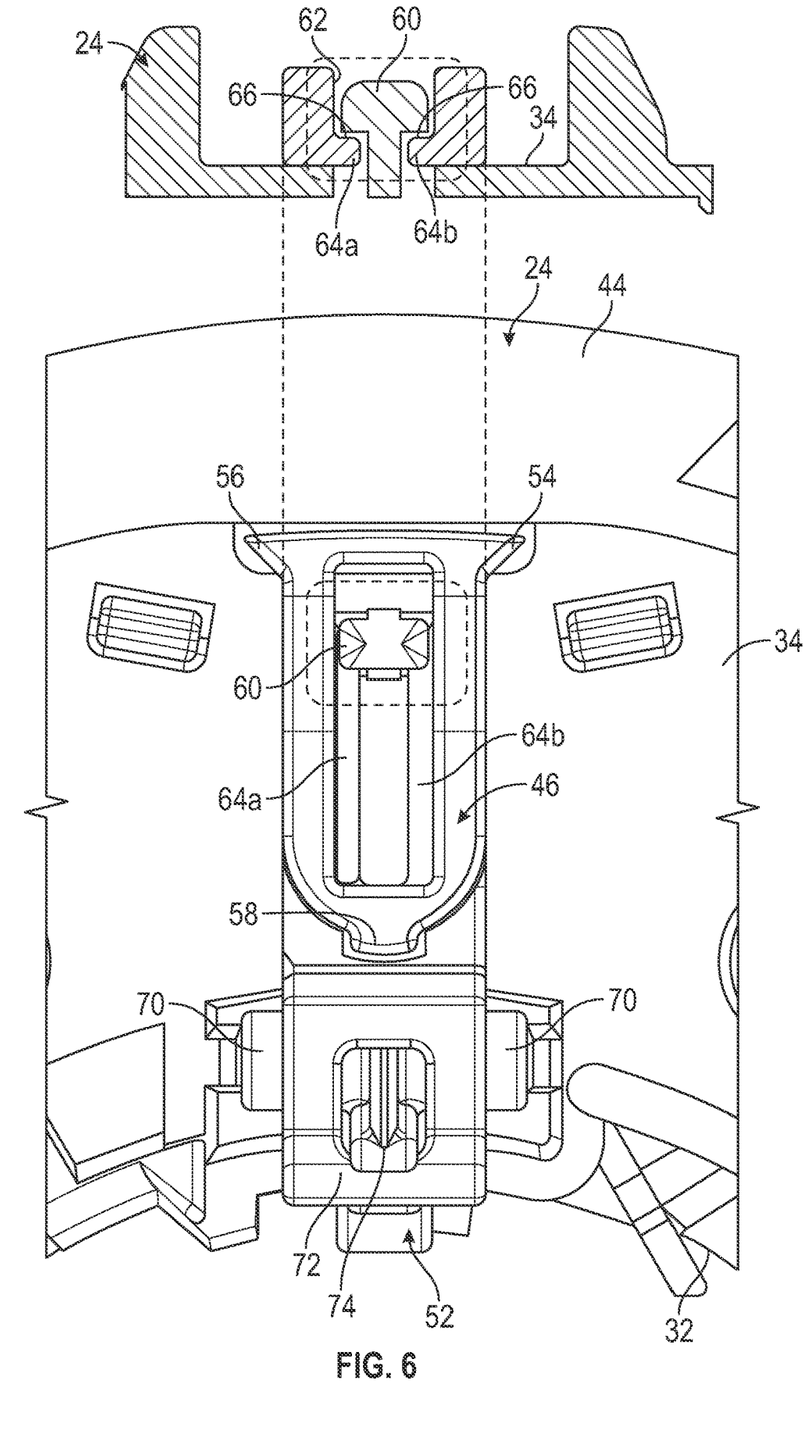
FIG. 6 is a top view an embodiment of the steering roll connector illustration the position of a locking lever, spring, and slide in an engaged position and a exploded cross-section of the post and slide.

The steering roll connector 20 may also include a slide 46 that may be supported by and movable (e.g., slide) on the surface. The slide 46 may move from an unengaged position to an engaged position where the slide 46 is positioned to engage and prevent the relative rotation between the roll rotor 24 and roll stator 22. For example, and with reference to FIGS. 4-6, the slide 46 may be moved on (or substantially on) the surface 34 through the slot 42 to engage (or be positioned to engage) the roll stator 22 and to prevent relative rotation between the roll rotor 24 and the roll stator 22. More specifically, a spring 50 may operatively engage the slide 46 to causes the slide 46 to be in the engaged position (e.g., move the slide to the engage position or maintain the slide in the engaged position). In some embodiments, the spring 50 may be a tether. A lever arm 52 a lever arm 52 operatively engaged with the wall 38 and the slide 46 and configured to pull the slide 46 to the unengaged position when the steering column is received in the opening 32.

The slide 46 may have a lever end 48 that may be partially, if not fully, positioned in the opening 32 when the slide 46 is in the unengaged position and near (e.g., adjacent) the opening 32 when in the engaged position. The slide 46 may also have a stator end 54 and a pair of jaws 56 extending from the stator end 54 and configured to engage the stator 22 when the slide 46 is in the engaged position. In some embodiments, a pair of jaws 56 may extend from the stator end 54. The pair of jaws 56 are configured to engage the stator 22 when the slide 46 is in the engaged position. The slide 46 may further define a slit 58 for receiving and operatively engaging the spring 50. Of course, the slide 46 may couple to the spring 50 in any other manner known in the art, e.g., direct coupling or indirect coupling. Moreover, in some embodiments, the spring 50 may be an elastic tether extending between and operatively engaged with pegs, or another structure, spaced on opposite sides of the slide 46.

In some embodiments, the steering roll connector 20 may include a post 60 in operative engagement with the surface 34 of the roll rotor, and the post 60 may be positioned relative to the slide 46 to direct movement of the slide 46 linearly between the unengaged and engaged positions. The post 60 may be positioned relative to the slide 60 in many positions and still be within the scope of the present invention. To direct the movement of the slide 46, the post 60 may have an end defining a ledge 64 configured to maintain (e.g., engages or directs) and facilitate movement of the slide 46 on the surface 34 of the roll rotor 24. In some embodiments, the end of the post 60 may define a pair of ledges 66 (best illustrated in FIG. 6).

In some embodiments (e.g., FIGS. 1-6), the slide 46 may define a first void 62 having a perimeter (shown but not numbered in the FIGS.), where the first void 62 is sized to receive the post 60. In other words, the post 60 may be utilized to position the slide 46 on the surface 34 by aligning the slide 46 to receive the post 60 when placed on the surface 34. In some embodiment, the perimeter of the first void 62 may define a rectangular shape with edges. In such embodiments, the seat 64 may comprise a first seat 64a defined at a first edge and a second seat 64b defined at a second edge spaced opposite and parallel with the first edge. In such embodiments, the pair of ledges 66 (FIG. 6) of the post 60 may be configured to engage and cooperate with the seats 64a, 64b to maintain and facilitate movement of the slide 46 on the surface of the roll rotor 24. In some embodiments, the first and second edges define a length and the first and second seats 64a, 64b extend a portion of the length, i.e., do not extend the entire length. The seats 64a, 64b may extend the same length to define a gap 68 within the first void 62 where the gap 68 may receive the post 60 with the pair of ledges 66. The first void 62 may have a width sized slightly larger than the width of the post 60 and the gap 68 may have a width sized slightly larger than the width of the pair of ledges 66. The slight variance of the widths allows for the slide 46 to receive the post 60, with or without the ledges 66 and to provide for linear motion of the slide 46 relative to the post 60 with a limited tolerance for non-liner movement of the slide 46 relative to the post 60. Alternatively, the seats 64a, 64b, or portions of the seat 64, may extend the entire length. In such embodiments, the pair of ledges 66 may still be employed, or removed, from the post 60.

The steering roll connector 20 may also comprise a lever arm 52 operatively engaged with the wall 38 and the slide 46 and configured to pull the slide 46 to the unengaged position when the steering column is received in the opening 32. The lever arm 52 may have a pair of pivot post 70 with may operatively engage the wall 38 to facilitate pivoting of the lever arm. The pivot post 70 may operatively engage the wall 38 directly or indirectly and in any manner known in the art to facilitate pivoting of the lever arm. It is also contemplated that the pivot post 70 may be in operative engagement with a spring, such as a torsion spring, with causes movement of the lever arm 52 and in turn the slide 46 to facilitate the linear movement of the slide 46 between the engaged and unengaged positions.

In some embodiments, the slide 46 may define a second void 72 that may be positioned adjacent the lever end 48. The lever arm 52 may have a slide end 74 positioned in the second void 72 and the slide end 74 is configured engage and pull the slide 46 to the unengaged position. The slide end 74 may further be defined as a hooked end defining a hooked shape. The hooked shape of the slide end 74 facilitates the engagement of the lever arm 52 with the slide 46. In some embodiments, a fin 76 may extend from the slide end 74 and the fin 76 may be configured to prevent or stop undesired movement of the slide 46 into the opening 32. In other words, the fin 76 may be sized such that when the slide 46 is in the unengaged position the fin 76 and the slide end 74 is equal to, or greater than, the size of the second void 72 which in turn locks the joint, or engagement, between the lever arm 52 and slide 46 to stop movement of the slide 46.

In some embodiments, a pin (not illustrated) may operative engage, or extend from, the slide 46 to direct movement of the slide 46. In such an embodiment, a slot (not illustrated) in the surface 34 may be configured to receive and cooperate with the pin to direct movement of the slide 46 linearly between the unengaged and engaged positions. It is to be appreciated the slot may be defined in the cover 44.

In some embodiments, the pin may be employed to prevent movement of the slide 46. In such embodiments, the operative engagement of the pin with the slide 46 may provide for the pin to be removed from the slide 46 to allow the slide 46 to move between the engaged and unengaged positions. Such employment of the pin may be beneficial during manufacture of the steering roll connector 20 as the roll rotor 24 with the slide 46 (among other part, e.g., the lever arm 52), may be assembled prior to being assembled to or coupled with the roll stator 22.

Figure 7:
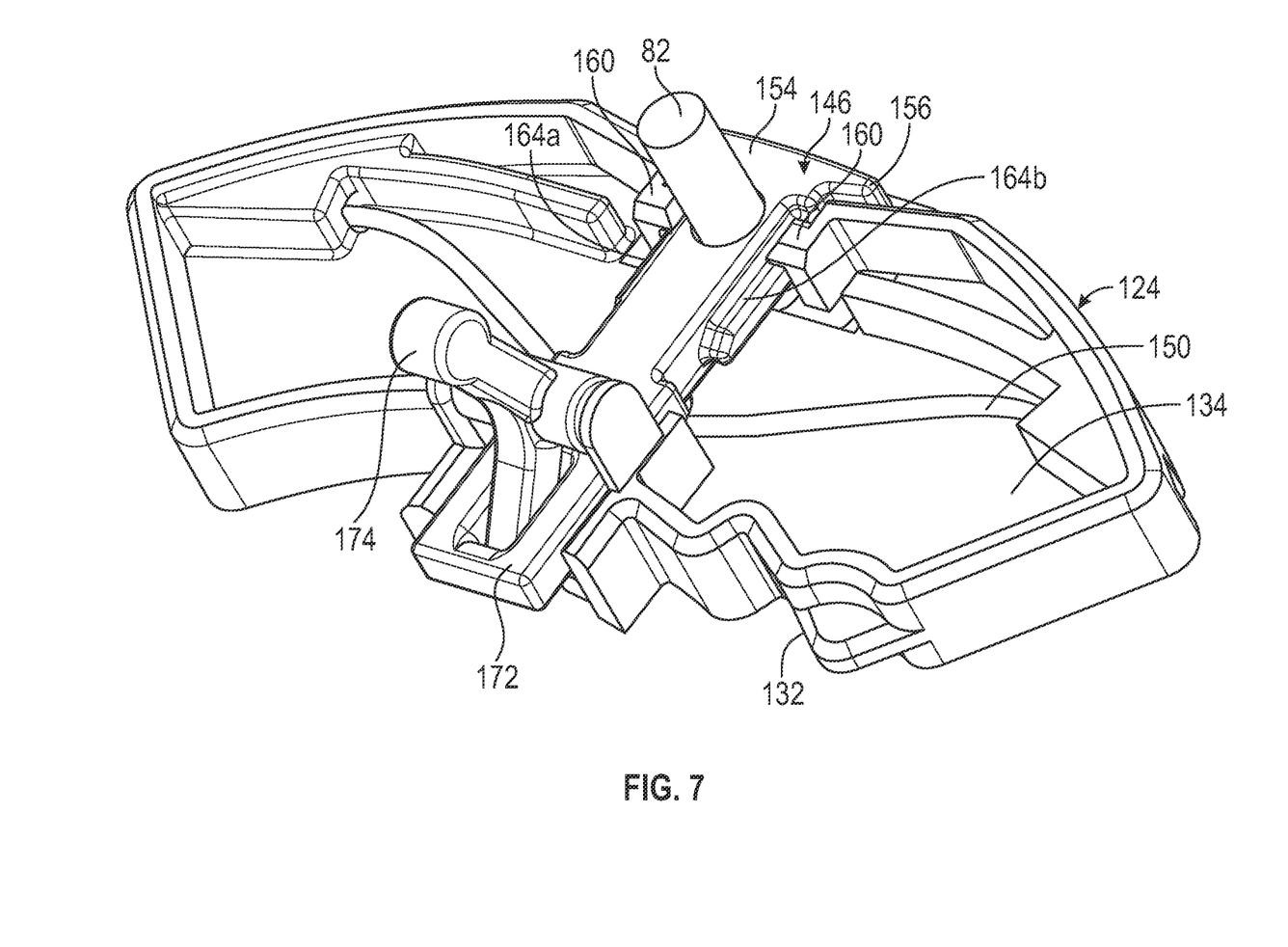
FIG. 7 is a partial perspective view illustrating an embodiment of the steering roll connector including a pin.
Figure 8:
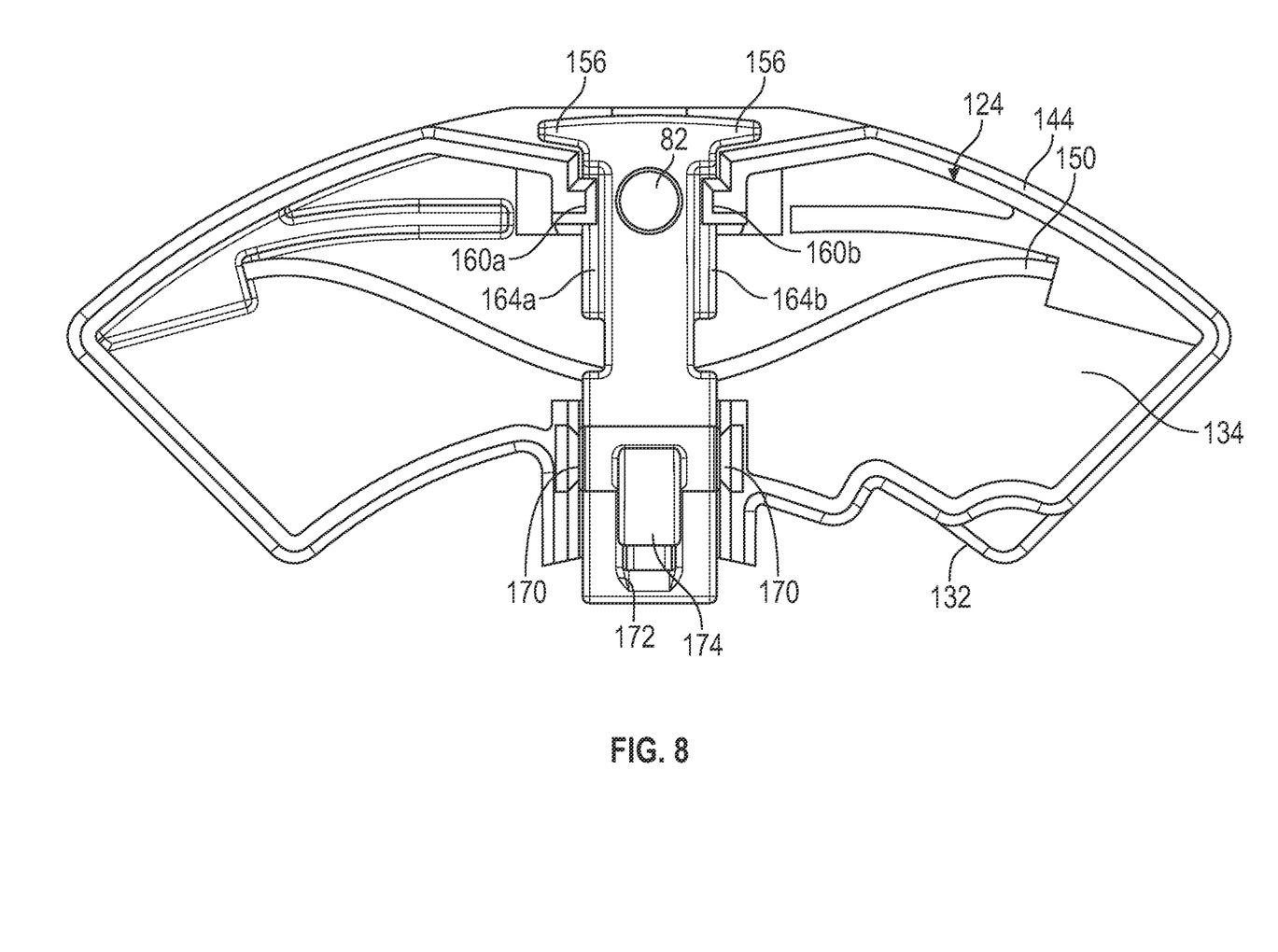
FIG. 8 is a partial perspective view illustrating an embodiment of the steering roll connector illustrating the pin removed.

In some embodiments (e.g., FIGS. 7-9), posts 160 may be positioned adjacent the slide 146. The posts 160 may be positioned adjacent each side of the slide 146 to engage, maintain and facilitate movement of the slide 146 on the surface 34. In such embodiments, the slide 146 may define first and second seats 164a, 164b at its sides. In such embodiments, the posts 160 may operatively engage the seats 164a, 165b engage, maintain and facilitate movement of the slide 146 on the surface 34.

In some embodiments, a pin 82 may operatively engage the slide 146. The slide 146 may define a pin void 84 for receiving the pine 82. When the pin 82 is in operative engagement with the slide 146 and the cover 144 (FIG. 8) is employed, the pin 82 may engage a pin cover void 86 to prevent movement of the slide 146. The pin 82 may be removed to allow movement of the slide 146 between the engaged and unengaged positions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering roll connector configured to operatively engage a steering column, the steering roll connector comprising:
    a roll stator;
    a roll rotor telescoped in and rotatably coupled to the roll stator to provide for relative rotation between the roll rotor and the roll stator;
    the roll rotor has a wall and a surface, and the wall defines an opening sized to receive the steering column;
    a slide supported by and movable on the surface from an unengaged position to an engaged position where the slide is positioned to engage and prevent the relative rotation between the roll rotor and roll stator;
    a spring operatively engaged with the slide to causes the slide to be in the engaged position; and
    a lever arm operatively engaged with the wall and the slide and configured to pull the slide to the unengaged position when the steering column is received in the opening.

2. The steering roll connector of claim 1, wherein the slid has a stator end and a pair of jaws extending from the stator end and configured to engage the stator when the slide is in the engaged position.

3. The steering roll connector of claim 1, further comprising a pin in operative engagement with the slide and the pin is configured to restrict movement of the slide.

4. The steering roll connector of claim 1, further comprising a pin in operative engagement with the slide to direct movement of the slide linearly between the unengaged and engaged positions.

5. The steering roll connector of claim 4, further comprising a slot in the surface where the slot is configured to receive the pin to direct movement of the slide linearly between the unengaged and engaged positions.

6. The steering roll connector of claim 1, wherein a pair of pegs are operatively engaged with the surface and spaced apart from one another and on opposite sides of the slide.

7. The steering roll connector of claim 6, wherein the spring is further defined as an elastic tether extending between and operatively engaged with the pegs and the slide.

8. The steering roll connector of claim 7, wherein the slid further defines a slit for receiving and operatively engaging the tether.

9. The steering roll connector of claim 1, wherein the slide has a lever end partially positioned in the opening when the slide is in the unengaged position and near the opening when in the engaged position.

10. The steering roll connector of claim 9, wherein the slide defines a second void adjacent the lever end.

11. The steering roll connector of claim 10, wherein the lever arm has a slide end positioned in the second void and the slide end is configured engage and pull the slide to the unengaged position.

12. The steering roll connector of claim 11, wherein the slide end of the lever arm is further defined as a hooked end defining a hooked shape.

13. The steering roll connector of claim 11, wherein a fin extends from the slide end of the lever arm and the fin is configured to prevent undesired movement of the slide into the opening.

14. The steering roll connector of claim 1 further comprising a post in operative engagement with the surface of the roll rotor, and the post is positioned relative to the slide to direct movement of the slide linearly between the unengaged and engaged positions.

15. The steering roll connector of claim 14, wherein the slide defines a first void having a perimeter and is sized to receive the post.

16. The steering roll connector of claim 15, wherein a seat is defined in the perimeter.

17. The steering roll connector of claim 15, wherein the post has an end defining a ledge that maintains and facilitates movement of the slide on the surface of the roll rotor.

18. The steering roll connector of claim 15, wherein the perimeter of the first void defines a rectangular shape and edges and the seat comprises a first seat defined at a first edge and a second seat defined at a second edge spaced opposite to and parallel with the first edge.

19. The steering roll connector of claim 18, wherein the first and second edges define a length and the first and second seats extend a portion of the length.

20. The steering roll connector of claim 19, wherein the post has an end defining a pair of ledges configured to engage and cooperate with the seats to maintain and facilitate movement of the slide on the surface of the roll rotor.

\* \* \* \* \*